United States Patent
Liu

(10) Patent No.: US 7,938,327 B2
(45) Date of Patent: May 10, 2011

(54) DATA CAPTURING ASSEMBLY AND METHOD AND INFORMATION STORAGE APPARATUS

(75) Inventor: Chia-Liang Liu, Guangdong (CN)

(73) Assignee: Hon Hai Precision Industry Co., Ltd., Tucheng Dist., New Taipei (TW)

( * ) Notice: Subject to any disclaimer, the term of this patent is extended or adjusted under 35 U.S.C. 154(b) by 1294 days.

(21) Appl. No.: 11/308,923

(22) Filed: May 26, 2006

(65) Prior Publication Data

US 2007/0125853 A1    Jun. 7, 2007

(30) Foreign Application Priority Data

Dec. 1, 2005    (CN) .......................... 2005 1 0102118

(51) Int. Cl.
*G06K 7/00*    (2006.01)
(52) U.S. Cl. ........................ 235/435; 235/436
(58) Field of Classification Search ............. 235/472.01–472.03, 435, 436; 710/100
See application file for complete search history.

(56) References Cited

U.S. PATENT DOCUMENTS

| | | | | |
|---|---|---|---|---|
| 3,579,128 | A * | 5/1971 | Smith et al. | .................... 327/233 |
| 5,426,741 | A | 6/1995 | Butts, Jr. et al. | |
| 5,513,334 | A | 4/1996 | Alexander | |
| 6,338,105 | B1 | 1/2002 | Niizuma | |
| 6,510,532 | B1 | 1/2003 | Pelly et al. | |
| 6,516,361 | B2 | 2/2003 | Lym et al. | |
| 2002/0010821 | A1 * | 1/2002 | Yu et al. | ........................ 710/100 |

FOREIGN PATENT DOCUMENTS

| | | |
|---|---|---|
| TW | 327212 | 2/1998 |
| TW | 375529 | 12/1999 |

* cited by examiner

*Primary Examiner* — Jamara A Franklin
(74) *Attorney, Agent, or Firm* — Winston Hsu; Scott Margo

(57) ABSTRACT

A data capturing apparatus includes a start/stop detecting unit, a data capturing unit, and a data converting unit. The start/stop detecting unit is used for detecting a start and an end of a data transfer from an information storage apparatus to the data capturing apparatus. The data capturing unit for receiving data from the information storage apparatus. The data converting unit is used for transforming the received data into differential USB transferable data. A related data capturing method and a storage medium recorded with an application program to accomplish the data capturing method are also provided.

19 Claims, 5 Drawing Sheets

|  | Start Control Signal | End Control Signal | Output of Gate |
|---|---|---|---|
| initial state | 0 | 1 | 0 |
| Data Transfer Starts | 1 | 1 | 1 |
| Data Transfer Stops | 1 | 0 | 0 |

FIG. 4

DATA CAPTURING ASSEMBLY AND METHOD AND INFORMATION STORAGE APPARATUS

FIELD OF THE INVENTION

This invention relates to data capturing apparatuses and methods and, more particularly, to a data capturing apparatus for capturing instant data from a working information storage apparatus and a data capturing method thereof.

DESCRIPTION OF RELATED ART

Information storage apparatuses, such as video compact disc (VCD) players, digital versatile disc (DVD) players, or compact disc-read only memory (CD-ROM) players are widely used for recording information from and/or reproducing information onto discs. In order to design, debug and/or improve the design of the information storage apparatuses, it is desirable to know how existing information storage apparatuses behave. Generally, the information storage apparatuses include a plurality of components, each performing a specific task. Such components include servo and decode circuits and other integrated circuits. Behaving aspects of the information storage apparatuses are the activities of the components of the information storage and/or data transfer between each two components.

In the past, hardware and software engineers had used various methods to monitor the information storage apparatuses. One method is accomplished by adding monitoring codes into the information storage apparatuses to capture and output data of the information storage apparatuses. However, this method has a disadvantage of deliberately modifying the information storage apparatuses under monitoring, thereby obscuring the true behavior of the information storage apparatuses. Another method is accomplished by using an intermediate device to capture the data from the information storage apparatuses and then transfer the captured data to an analysis apparatus. Currently, the information storage apparatuses output data via a recommend standard 232 (RS232) interface. However, when the information storage apparatuses run at a high speed, the working data output via the RS232 interface delays data output due to a relatively low band width of the RS232 interface.

Therefore, an improved data capturing apparatus is desired.

SUMMARY OF THE INVENTION

A data capturing apparatus includes a start/stop detecting unit, a data capturing unit, and a data converting unit. The start/stop detecting unit is used for detecting a start of a data transfer and an end of a data transfer from an information storage apparatus to the data capturing apparatus. The data capturing unit for receiving data from the information storage apparatus. The data converting unit is used for transforming the received data into differential USB transferable data.

A data capturing method for a data capturing apparatus includes steps of: detecting a start of a data transfer from an information storage apparatus to the data capturing apparatus; receiving data from the information storage apparatus when the data transfer starts; detecting an end of the data transfer; and transforming the received data into differential USB transferable data when the data transfer stops.

A storage medium is provided for recording an application program. The application program has a computer executable the steps of: detecting a start of a data transfer from an information storage apparatus to the data capturing apparatus; receiving data from the information storage apparatus when the data transfer starts; detecting an end of the data transfer; and transforming the received data into differential USB transferable data when the data transfer stops.

Other advantages and novel features will become more apparent from the following detailed description of preferred embodiments when taken in conjunction with the accompanying drawings, in which:

BRIEF DESCRIPTION OF THE DRAWINGS

Many aspects of the data capturing apparatus and the data capturing method thereof can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

FIG. 4 is a table illustrating exemplary relationships among an output of the start detecting module, an output of the stop detecting module, and an output of the NAND gate.

DETAILED DESCRIPTION OF THE INVENTION

Reference will now be made to the drawings to describe the preferred embodiment of the present data capturing apparatus, in detail.

Figure 1:
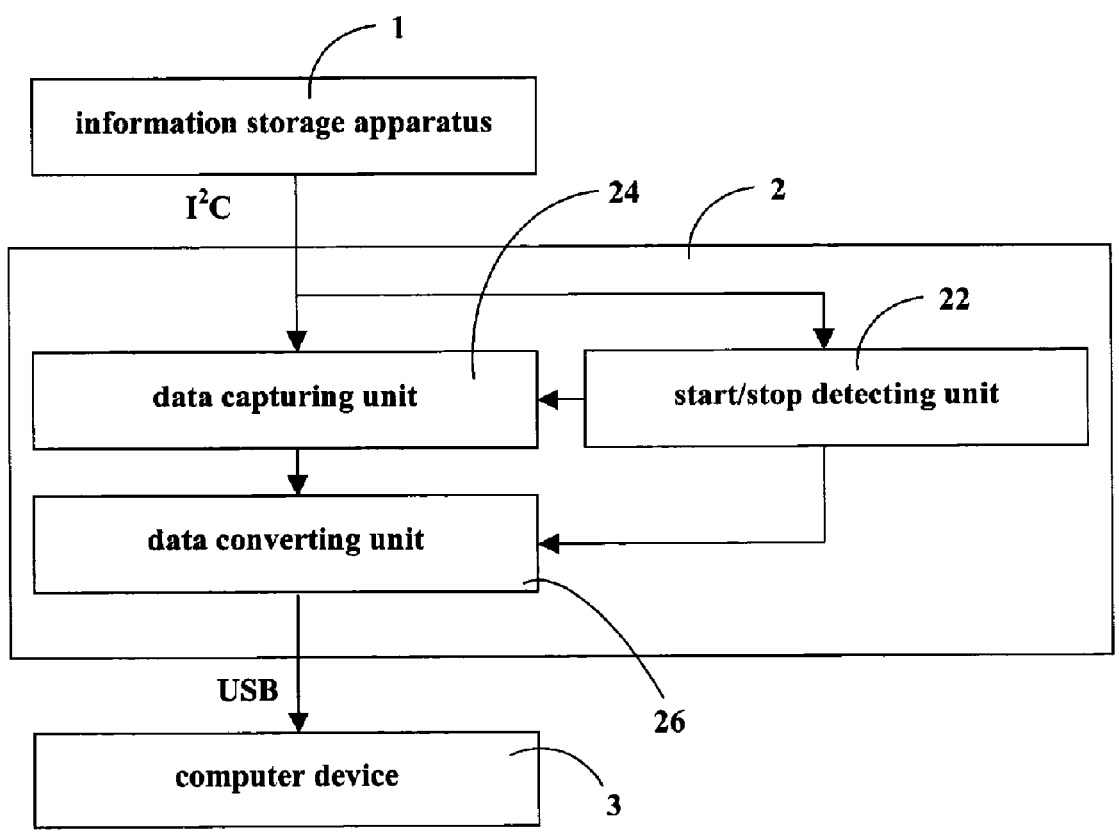
FIG. 1 is a block diagram of a data capturing apparatus in accordance with an exemplary embodiment, the data capturing apparatus including a start/stop detecting unit.

Referring to FIG. 1, a block diagram of a data capturing apparatus 2 in accordance with an exemplary embodiment is illustrated. The data capturing apparatus 2 connects to an information storage apparatus 1 and a computer device 3, and is used for capturing working data from the information storage apparatus 1 and then transferring the working data to the computer device 3.

The information storage apparatus 1 includes an RS232 interface (not shown). In general, the RS232 interface includes a receive data (RxD) pin and a transmit data (TxD) pin. In this exemplary embodiment, the RxD pin and the TxD pin are modified by the data capturing apparatus 2 to serve as a data line SDA and a clock line SCL of an inter-integrated circuit ($I^2C$) interface, respectively. The data line SDA is used for transmitting data to be transferred, and the clock line SCL is used for carrying a periodic clock signal.

Figure 2:
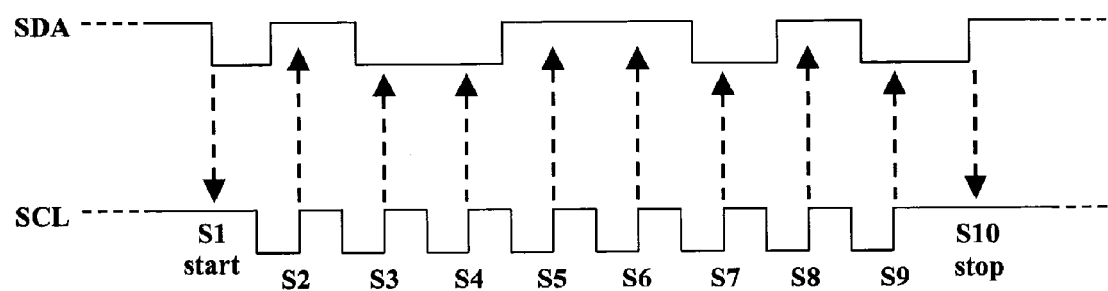
FIG. 2 is a signal diagram for data transfer via an $I^2C$ interface.

Referring also to FIG. 2, an exemplary signal diagram showing data transfer between the information storage apparatus 1 and the data capturing apparatus 2 via the $I^2C$ interface is illustrated. The data transfer is defined in following steps: During the state of no data transfer, both the data line SDA and the clock line SCL remain at a high level. When data is ready for transfer, the SDA is pulled down to a low level, which is denoted by S1 and indicates that the information storage apparatus is ready for data transfer and informs the data capturing apparatus 2 of the data transfer.

Subsequently, the clock line SCL begins transmitting a periodic clock signal and the data line SDA serially transmits 8 bits of data, which is denoted by S2 to S9. Data values are indicated at the rising edge of the SCL. Each of the high level and the low level corresponding to a rising edge of the clock line SCL is identified as "1" and "0", respectively. For example, a first rising edge of the SCL that is denoted by S2 (or S5, S6, S8), a bit transmitted on the data line SDA is "1", a second rising edge of the SCL that is denoted by S3 (or S4, S7, S9), a bit transmitted on the data line SDA is "0".

Finally, at an end of data transmission, the periodic clock signal on the clock line SCL stops and the clock line SCL remains at the high level, while the data line SDA is pulled from the low level up to the high level. The end of data transmission is denoted by S10.

The data capturing apparatus 2 includes a start/stop detecting unit 22, a data capturing unit 24, and a data converting unit 26. The start/stop detecting unit 22 and the data capturing unit 24 connect to the information storage apparatus 1 to receive data from the information storage apparatus 1. The start/stop detecting unit 22 is used for detecting a start and an end of the data transfer from the information storage apparatus 1 to the data capturing apparatus 2. The detections of the start/stop detecting unit 22 are used to indicate working states of the data capturing unit 24 and the data converting unit 26.

The data capturing unit 24 is used for capturing the data from the information storage apparatus 1. The data converting unit 26 is used for converting the captured data into differential universal serial bus (USB) transferable data to be transmitted to the computer device 3.

Figure 3:
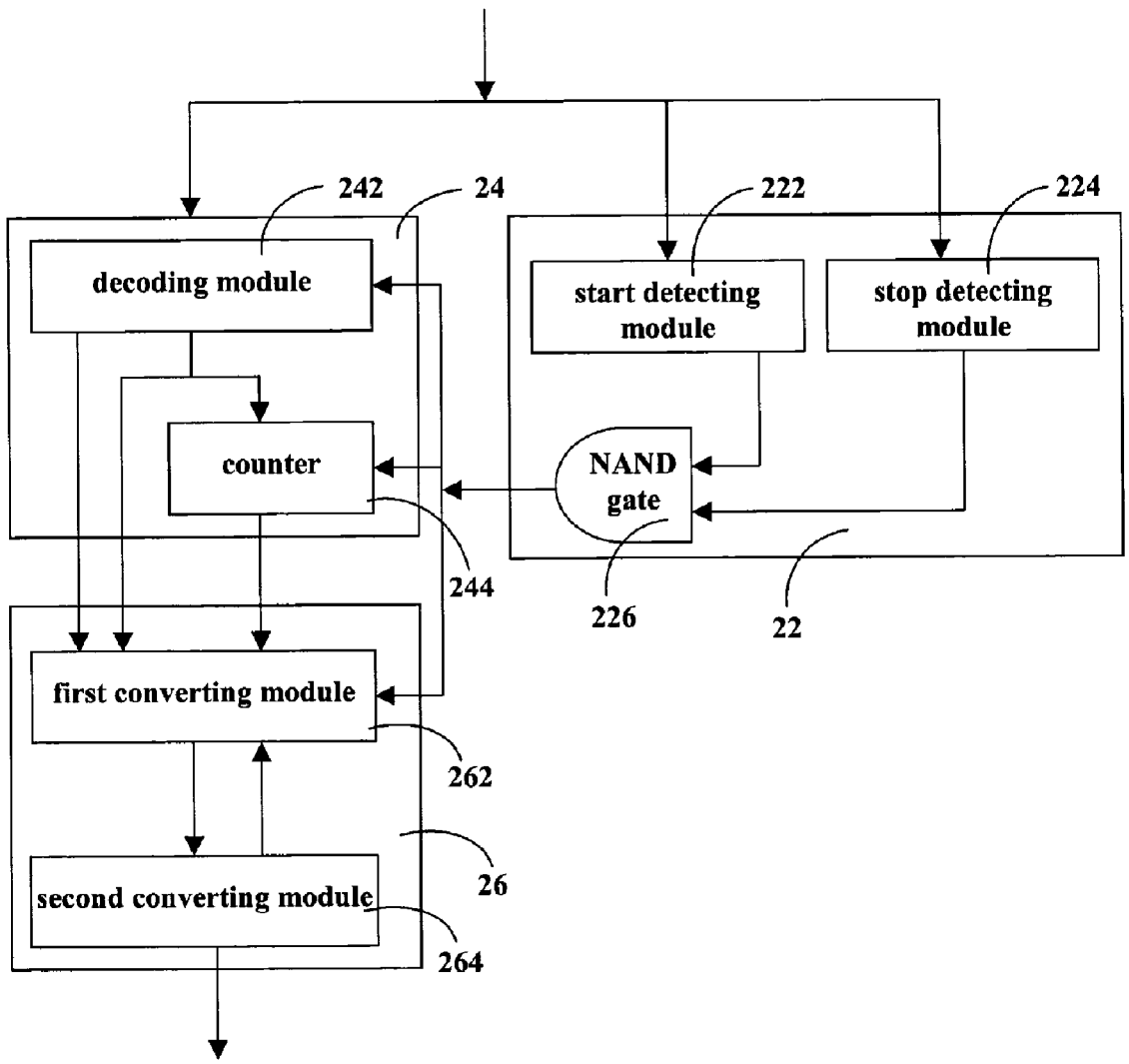
FIG. 3 is a more detailed block diagram of the data capturing apparatus of FIG. 1, the start/stop detecting unit including a start detecting module, a stop detecting module and an NAND gate.

Referring to FIG. 3, a more detailed block diagram of the data capturing apparatus 2 is illustrated. The start/stop detecting unit 22 includes a start detecting module 222, a stop detecting module 224, and an NAND gate 226. The start detecting module 222 is used for detecting the start of the data transfer from the information storage apparatus 1 to the data capturing apparatus 2 and creating a start control signal. The stop detecting module 224 is used for detecting the end of the data transfer from the information storage apparatus 1 to the data capturing apparatus 2 and for creating an end control signal. The NAND gate 226 is used for receiving the start signal from the start detecting module 224 and the end control signal from the stop detecting module 226, and performing a logical AND operation based on the start control signal and the end control signal. The output of the NAND gate 226 is then outputted to the data capturing unit 24 and the data converting unit 26.

Referring to FIG. 4, exemplary relationships among the start control signal, the end control signal, and an output of the NAND gate 226. It is presumed that each of the start control signal and the end control signal is set to a value that is either "0" or "1". The start control signal is kept at "0" and not changed to "1" until data transfer starts. The end control signal is kept at "1" and not changed to "0" until data transfer stops. At an initial state, the start control signal is set to "0", the end control signal is set to "1", and an output of the NAND gate is "0". At this time, the data capturing unit 24 and the data converting unit 26 remain idle. When the data transfer starts, the start control signal changes from "0" to "1", while the end control signal remains at "1". At this time, the NAND gate 226 performs a logical AND operation and outputs a first logical AND operation result "1", and the data capturing unit 24 and the data converting unit 26 begins to capture data. When the data transfer stops, the end control signal changes from "1" to "0", while the start control signal remains at "1". At this time, the NAND gate 226 performs a logical AND operation and outputs a second logical AND operation result "0", and the data capturing unit 24 and the data converting unit 26 stops capturing data.

The data capturing unit 24 includes a decoding module 242 and a counter 244. The decoding module 242 is used for capturing the working data from the information storage apparatus 1 on a bit-by-bit basis, and then analyzing the captured working data to determine whether the bits included in the captured working data are "1" or "0". The counter 244 is used for counting the number of bits transferred by the data line SDA. After every 8-bit data transferred, the counter 244 generates a switch signal indicating an end of 8-bit data transfer.

The data converting unit 26 includes a first converting module 262 and a second converting module 264. The first converting module 262 is connected to both the decoding module 242 and the counter 244 to receive the working data from the decoding module 242 and the switch signal from the counter 244. The first converting module 262 is used for transforming the working data into parallel data. The second converting module 264 is used for transforming the parallel data into the differential USB transferable data to be transmitted to the computer device 3.

Figure 5:
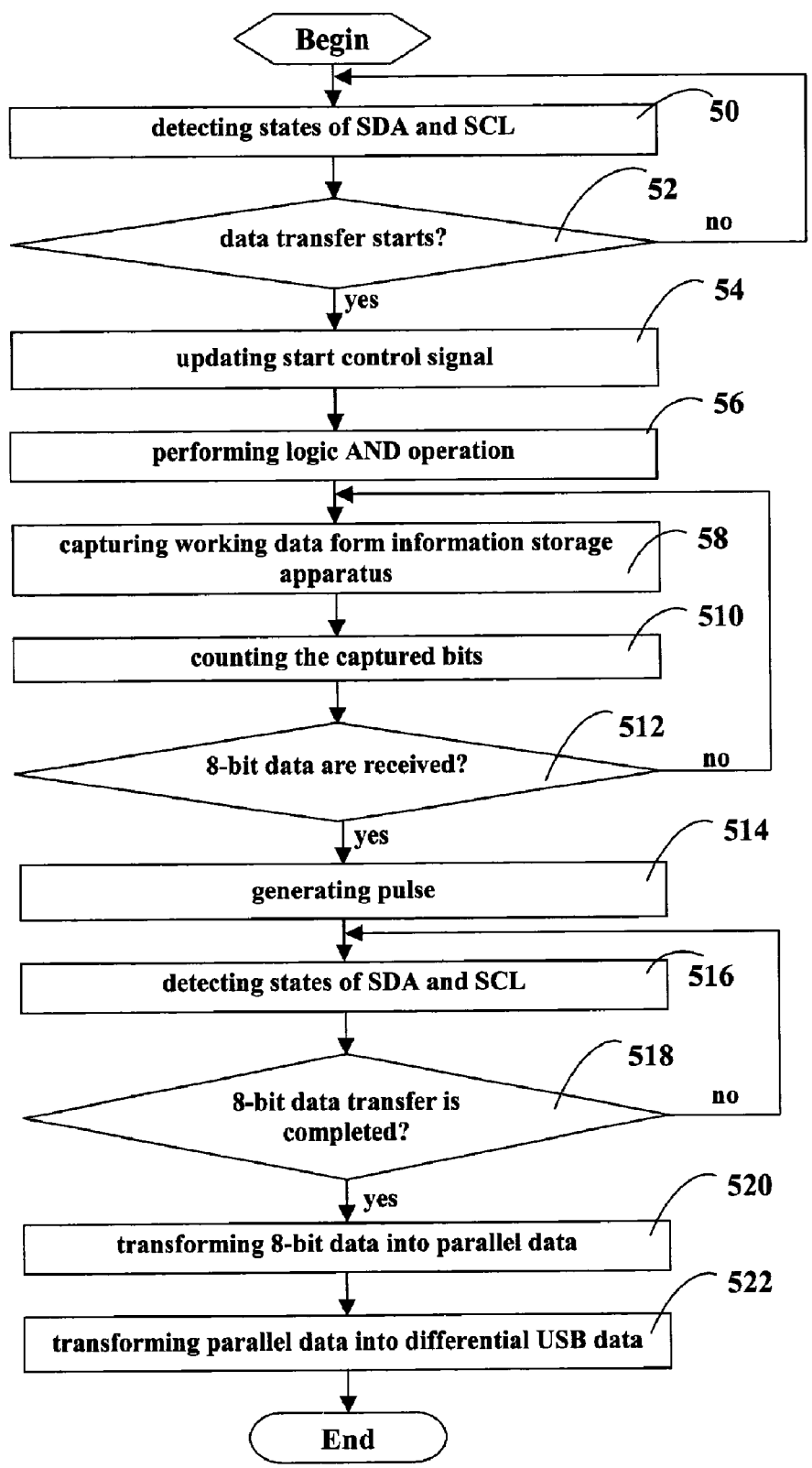
FIG. 5 is a flow chart illustrating a data capturing procedure of the data capturing apparatus of FIG. 1.

Referring to FIG. 5, a data capturing procedure of the data capturing apparatus 2 is illustrated. First, in step 50, the start detecting module 222 detects states of the clock line SCL and the data line SDA to determine whether a transition from the high level to the low level occurs on the data line SDA while the clock line SCL remains at the high level. Then in step 52, the start detecting module 222 determines whether the data transfer starts based on the states of the clock line SCL and the data line SDA. If the transition from the high level to the low level occurs on the data line SDA while the clock line SCL remains at the high level, the data transfer starts, otherwise the data transfer does not starts. If the data transfer starts, in step 54, the start detecting module 222 updates the start control signal from "0" to "1". Successively, in step 56, the NAND gate 226 performs the logical AND operations based on the start control signal and the end control signal and outputs the first logical AND operation result "1" to the data capturing unit 24 and the data converting unit 26. After receiving the first logical AND operation result "1", the data capturing unit 24 captures the working data from the information storage apparatus 1 on the bit-by-bit basis (step 58). The decoding module 242 of the data capturing unit 24 analyzes the captured working data to determine whether the bits included in the captured working data are "1" or "0". The bits included in the captured working data are transferred to the first converting module 262 in succession. Then, the counter 244 counts the bits that are received by the data capturing module 242 (step 510). In step 512, the counter 244 determines whether 8-bits are received by the data capturing module 242.

If the 8-bit data are received by the data capturing module 242 and transferred to the first converting module 262, the counter 244 generates the switch signal to indicate the 8-bit data are received. In step 516, the stop detecting module 224 detects the states of the clock line SCL and the data line SDA to determine whether a transition from the low level to the high level occurs on the data line SDA while the clock line SCL remains at the high level. In step 518, a conclusion is made as to whether the 8-bit data transfer is completed based on the states of the clock line SCL and the data line SDA. The stop detecting module 224 updates the end control signal from "1" to "0" when detecting a transition like that in the final point S10 occurs. The NAND gate 226 performs a logical AND operation based on the start control signal and the stop control signal and outputs the second logical AND operation result "0" to the data capturing unit 24 and the data converting unit 26. After receiving the second logical AND operation result "0", in step 520, the first converting module 262 transforms the 8-bit data into the parallel data. Finally, in step 522, the second converting module 264 transforms the parallel data into the differential USB transferable data to be transmitted to the computer device 3. After step 522, the procedure is terminated.

The data capturing apparatus 2 employs a USB port to transfer the working data, and the USB port has a brand width that is wide enough for addressing the deficiency caused by the RS232 that has a relatively narrow brand width. Furthermore, the data capturing apparatus 2 does not add monitoring codes to the information storage apparatus 1, thereby not obscuring the true behavior of the information storage apparatus 1.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A data capturing assembly, comprising:
an information storage apparatus; and
a data capturing apparatus, for capturing data from the information storage apparatus;
wherein the information storage apparatus comprises an RS232 interface, the RS232 interface comprises a receive data (RxD) pin and a transmit data (TxD) pin, the RxD pin and the TxD pin are modified by the data capturing apparatus to serve as a data line SDA and a clock line SCL of an inter-integrated circuit (I2C) interface respectively, thereby the data of the information storage apparatus is transmitted through the inter-integrated circuit (I2C) interface; and
wherein the data capturing apparatus comprises:
a start/stop detecting unit for detecting a start of data transfer and an end of a data transfer from the information storage apparatus to the data capturing apparatus;
a data capturing unit for receiving data from the information storage apparatus; and
a data converting unit for transforming the received data into differential USB transferable data.

2. The data capturing assembly as claimed in claim 1, wherein when the start/stop detecting unit detects the start of the data transfer, the start/stop detecting unit signals the data capturing unit to receive the data from the information storage apparatus.

3. The data capturing assembly as claimed in claim 1, wherein when the start/stop detecting unit detects the end of the data transfer, the start/stop detecting unit signals the data capturing unit to stop receiving the data from the information storage apparatus.

4. The data capturing assembly as claimed in claim 1, wherein the start/stop detecting unit comprises a start detecting module for detecting the start of the data transfer, a stop detecting module detecting the end of the data transfer.

5. The data capturing assembly as claimed in claim 4, wherein the start/stop detecting unit further comprises a logical gate for processing signals outputted by start detecting module and the stop detecting module.

6. The data capturing assembly as claimed in claim 4, wherein the output of the start detecting module has a value being one of "1" and "0" in an initial state, when the data transfer starts, the value of the output of the start detecting module being changed from the one of "0" and "1" to the other one of "0" and "1".

7. The data capturing assembly as claimed in claim 4, wherein the output of the stop detecting module has a value being one of "1" and "0" in an initial state, when the data transfer stops, the value of the output of the stop detecting module being changed from the one of "1" and "0" to the other one of "1" and "0".

8. The data capturing assembly as claimed in claim 1, wherein the data capturing unit comprises a decoding module for receiving the data from the information storage apparatus on a bit-by-bit basis.

9. The data capturing assembly as claimed in claim 8, wherein the data capturing unit comprises a counter for counting received bits.

10. The data capturing assembly as claimed in claim 9, wherein the counter is used for generating a switch signal when an amount of the received bits reaches a predetermined amount to signal the data converting unit to transform the received bits into the differential USB transferable data.

11. The data capturing assembly as claimed in claim 1, wherein the data converting apparatus comprises a first converting module for transforming the received data into parallel data.

12. The data capturing assembly as claimed in claim 11, wherein the data converting apparatus comprises a second converting module for transforming the parallel data into the differential USB transferable data.

13. A data capturing method for a data capturing apparatus capturing data from an information storage apparatus, wherein the information apparatus comprises an RS232 interface, the RS232 interface comprises a receive data (RxD) pin and a transmit data (TxD) pin, the RxD pin and the TxD pin are employed to serve as a data line SDA and a clock line SCL of an inter-integrated circuit (I2C) interface respectively, thereby the data of the information storage apparatus is transmitted through the inter-integrated circuit (I2C) interface, the data capturing method comprising:
detecting a start of a data transfer from the information storage apparatus to the data capturing apparatus;
receiving data from the information storage apparatus when the data transfer starts;
detecting an end of the data transfer; and
transforming the received data into differential USB transferable data when the data transfer stops.

14. The data capturing method as claimed in claim 13, wherein the data is transferred from the information storage apparatus to the data capturing apparatus on a bit-by-bit basis.

15. The data capturing method as claimed in claim 14, further comprising steps of:
counting received bits; and
generating a switch signal when the received bits reaches a predetermined amount.

16. The data capturing method as claimed in claim 13, wherein the data transfer is based on an inter-integrated circuit protocol.

17. The data capturing method as claimed in claim 16, wherein the step of detecting the start and the end of the data transfer is performed by detecting signal transitions on a clock line and a data line.

18. An information storage apparatus recorded with an application program, the information storage apparatus comprising an RS232 interface, wherein the RS232 interface comprises a receive data (RxD) pin and a transmit data (TxD) pin, the RxD pin and the TxD pin are employed to serve as a data line SDA and a clock line SCL of an inter-integrated circuit (I2C) interface respectively, the application program having a computer executable steps of:
- detecting a start of a data transfer from an information storage apparatus to the data capturing apparatus;
- receiving data from the information storage apparatus when the data transfer starts;
- detecting an end of the data transfer; and
- transforming the received data into differential USB transferable data when the data transfer stops.

19. The information storage apparatus as claimed in claim 18, wherein the data transfer is based on an inter-integrated circuit protocol and through the inter-integrated circuit (I2C) interface.

* * * * *